United States Patent [19]

Mejane

[11] Patent Number: 4,831,649
[45] Date of Patent: May 16, 1989

[54] METHOD OF ROUTING CALLS FOR A NETWORK OF DIGITAL TIME-SWITCHED EXCHANGES

[75] Inventor: Jean-Romain Mejane, Cormeilles en Parisis, France

[73] Assignee: Telic Alcatel, Paris, France

[21] Appl. No.: 147,826

[22] Filed: Jan. 25, 1988

[30] Foreign Application Priority Data

Jan. 23, 1987 [FR] France .................. 87 00775

[51] Int. Cl.⁴ ............................................. H04M 3/36
[52] U.S. Cl. ...................................... 379/111; 379/115; 379/220; 379/137
[58] Field of Search ................ 379/111, 115, 121, 112, 379/219, 220, 133, 134, 137; 370/16, 54

[56] References Cited

U.S. PATENT DOCUMENTS 3,394,231 7/1968 Hopper et al. ..................... 179/18
4,532,625 7/1985 Stover ................................ 370/58
4,723,270 2/1988 Okamoto et al. ................. 379/134

FOREIGN PATENT DOCUMENTS 1458269 11/1966 France .

OTHER PUBLICATIONS

International Teletraffic Congress, vol. 5, Sep. 1985, pp. 795-801, Elsevier Science Publishers, Amsterdam, NL; G. R. Ash: "Use of trunk status map for real-time DNHR".
International Switching Symposium, Paris, May 7-11, 1979, pp. 171-177, FR; E. Szybicki et al.: "The introduction of an advanced routing system into local digital networks and its impact on the network enconomy, reliability and grade of service".
International Teletraffic Congress, vol. 5, Sep. 1985, pp. 861-866, Elsevier Science Publishers, Amsterdam, NL; J. M. Garcia et al.: "Comparative Evaluation of centralized distributed traffic routing policies in telephone networks".

Primary Examiner—Stafford D. Schreyer
Attorney, Agent, or Firm—Sughrue, Mion, Zinn, Macpeak & Seas

[57] ABSTRACT

A method of routing calls for a network of digital time-switched exchanges (A, B, C, D, E, F, D) interconnected by groups (18 to 28) of PCM time multiplex trunks, with each group ingterconnecting two exchanges. Each exchange establishes a utilization cost for each of the groups connected thereto. This cost is based on the busy fraction of the least busy trunk in the group of trunks under consideration and it is transmitted to all of the exchanges in the network in order to enable them to determine least cost paths for the calls that they are requested to set up.

6 Claims, 3 Drawing Sheets

METHOD OF ROUTING CALLS FOR A NETWORK OF DIGITAL TIME-SWITCHED EXCHANGES

The present invention relates to a method of routing calls for a network of digital time-switched exchanges interconnected via trunk groups each of which is constituted by one or more PCM trunks. It relates more specifically to networks of single- or multi-service exchanges which are distinct from public networks, to which they may possibly be connected at at least some nodes.

The routing methods implemented in public telephone networks have generally been designed for operations comprising a large number of nodes served by multiple-trunk groups.

Such public networks are for the most part, made up of equipment of various different ages and consequently using different technologies, and which have been designed to remain compatible with one another.

The size of public networks and/or the non-uniform nature of the equipment from which they are built up impose specific constraints which must be taken into account, in particular when routing calls. This can therefore give rise to choices which may be different from those which could be made for a network that is smaller and/or constituted by a uniform type of equipment.

The present invention therefore proposes a method of routing for use in a network comprising digital time-switched exchanges, which are preferably identical and are at least compatible conditions specified below, which exchanges are interconnected by trunk groups each interconnecting two exchanges via one or more PCM trunks.

According to a characteristic of the invention, each exchange determines, in real time, a utilization cost for each of the trunk groups connected thereto on the basis of the busy fraction as seen by itself of the least busy trunk in the group under consideration, in order to broadcast an update by contagion via the trunk groups to the other exchanges in the network, said updates specifying, each time the exchange observes a substantial change in the cost of utilization of a trunk group to which it is connected: the identify of the exchange, the identify of the trunk group concerned; the issue number of the update, and the newly determined utilization cost. Each exchange stores all of the updates which it produces or receives.

The routing of a call to be established through the network is established by the network exchange from which the call is initially requested; this exchange itself determines the routing having the minimum utilization cost on the basis of a shortest path algorithm known per se and on the basis of the stored updates, and it produces a message for setting up the routing specifying the, or each, exchange in the network through which the call should pass. This set-up message is transmitted over the trunk groups concerned as the selected routing is set up, and within each exchange it has the portion concerning that exchange only removed therefrom.

The invention, its characteristics, and advantages, are described in the following description with reference to the figures listed below.

Figure 1:
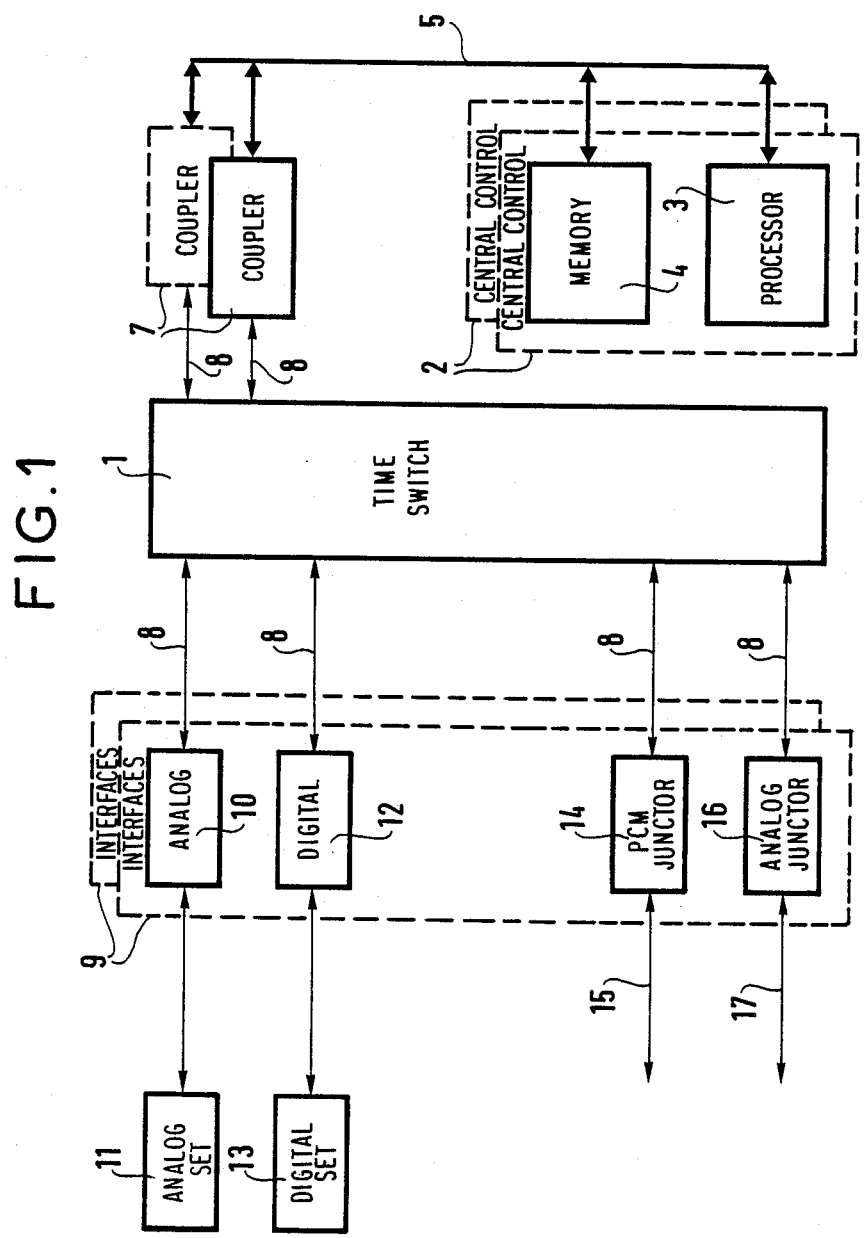
FIG. 1 is a block diagram of a time switched exchange suitable for implementing the method in accordance with the invention.

The digital time switched exchange shown in FIG. 1 is, for example, an exchange of the type described in the article "L'autocommutateur multiservice OPUS 4000" (The OPUS 4000 Multiservice Exchange) by Baudoin, Le, Mejane, Seveque, and Anizan, and published in the journal "Commutation et Transmission", 1985 number 4.

This digital time switched exchange is of the multiservice type enabling telephone sets and terminals to be put into communication with one another via the time switch 1 included therein, either directly if the sets or terminals to be put into communication are directly connected to the exchange under consideration, or else via other identical or compatible exchanges.

The time switch 1 is under the control of a central unit 2 which comprises one or more processors 3 in a structure which is generally duplicated for reasons of security.

A set of memories 4 is conventionally associated with the microprocessors 3 in each central unit in order to store operating programs and data required for exchange operation, and in particular, in the present case, the programs and data required for routing.

The memories in the set 4 and the processor 3 are conventionally interconnected over one or more buses 5 which also serve couplers having access to the time switch 1.

In the example shown, a set of several couplers 7 is shown which couplers are connected to the time switch over two-way time multiplexes 8. The couplers 7 are signalling couplers, for example, over which there passes all of the telephone signalling for processing by the exchange.

In this case, the time links 8 are conventional 32 time slot links in which time slot O is reserved for synchronization, and time slot 16 is reserved for signalling, leaving the other 30 time slots free for transmitting data or PCM-encoded speech samples, with the data or the samples being in the form of 8-bit bytes, in either case.

The time switch 1 is of the non-blocking time type and it switches speech, data, and signalling between the various time slots in the link 8 connected thereto. Some of the links are attributed to the couplers 7 as indicated above, while others serve local or de-centralized connection units 9.

The connection units 9 multiplex and demultiplex speech samples, data, and signalling to be switched or which have just been switche via the time switch 1. They also contain interface equipment for interfacing telephone sets, telephone terminals, or external telephone links that connect to the exchange.

For example, the interface equipments may be of the following types:

analog line equipment 10 for use with a telephone set or a telecommunications terminal 11 with which information is interchanged in analog form;

digital line equipment 12 for connection to digital telephone sets or terminals 13 with which speech samples, data and signalling are interchanged in digital form;

analog link junctors 16 for analog telephone network lines 17 connecting the exchange to distant exchanges; and multiplex link junctors 14 for PCM time multiplex links 15 connecting the exchange to distant exchanges.

Naturally, there is no need for multiplexing or demultiplexing in a connection unit 9 for a multiplex link 15 connecting said unit to a distant exchange.

In the example shown, the time multiplex links 15 are likewise thirty-two time slot links like the time divided links 8, and they therefore operate at a bit rate of 2048 Mbit/s.

Calls from a set or terminal 11 or 13 are routed from within the local exchange to which said set or terminal is connected, in the event that the exchange forms a part of a uniform network comprising other exchanges which are identical thereto or compatible therewith, and with which it can communicate via the muliplex links 15.

Figure 2:
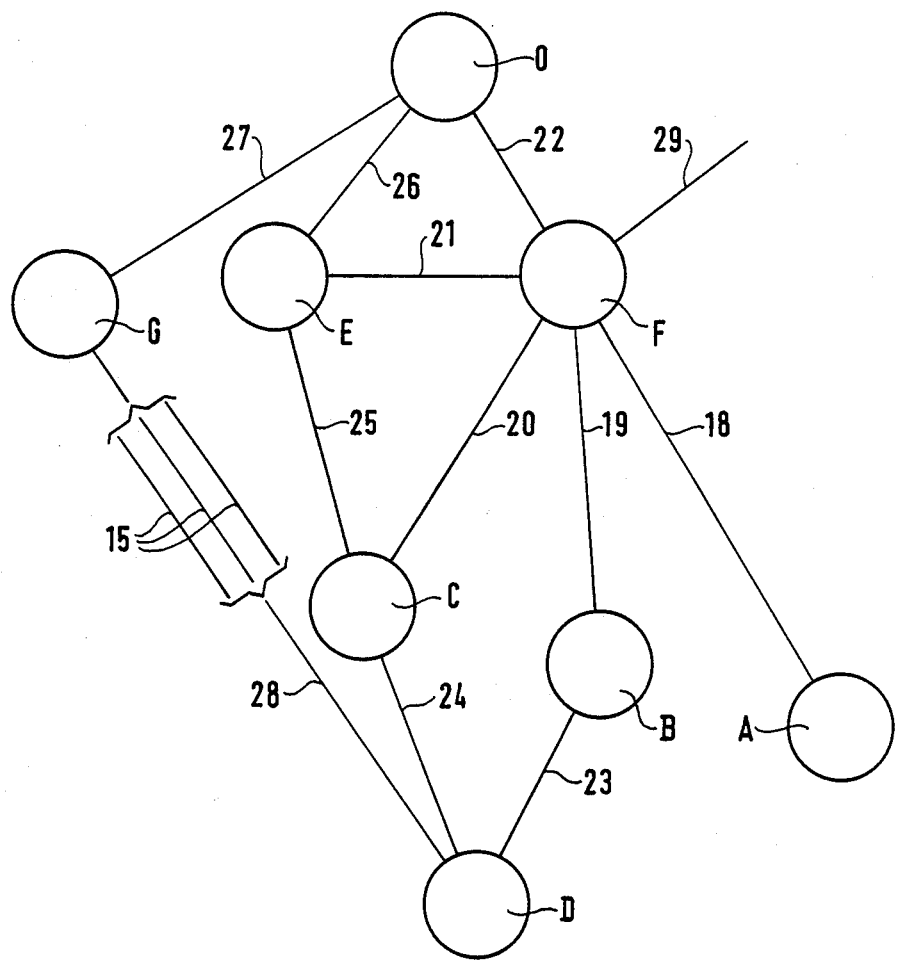
FIG. 2 is a diagram of an exchange network.

In the example shown, the network in which the routing method in accordance with the invention is implemented comprises a plurality of exchanges such as exchanges A, B, C, D, E, F, and O as shown in FIG. 2.

These exchanges are connected to one another on a point-to-point basis by trunk groups 18 to 28 each of which interconnects a pair of exchanges via one or more PCM time-divided trunks each constituted by a multiplex link 15, as can be seen for the three trunks of trunk group 28 interconnecting exchanges D and G.

Naturally, the network could also be connected at one or more of the exchanges to other exchanges which are not suitable for constituting a part of the network by virtue of various kinds of incompatibility, for example exchange F is connected over a trunk group 29 of analog links to a space-switched exchange (not shown). The network under consideration may also be a private network which is connected to a public network at one or more of its exchanges, said public network being operated differently so that the routing method described below can only be used within the private network.

Each exchange in the network which applies the routing method in accordance with the invention determines a "utilization cost" for each of the trunk groups connecting it to another exchange in the network, i.e. for exchange F this means trunk groups 18, 19, 20, 21, and 22 connecting it respectively to exchanges A, B, C, E, and O, but not trunk group 29.

In the present case, the "utilization cost" of a trunk group between two exchanges designates a factor determined from the busy fraction of the least busy trunk or time multiplex link 15 within the group.

To this end, each exchange uses its central unit 2 to determine the busy fractions of the various trunks belonging to the trunk groups which connect it to the other exchanges in the network.

The two exchanges connected to opposite ends of the same trunk group each determine the busy fraction of the trunks within the group independently from each other, and on the basis of this determination each of them determines the busy fraction of the least busy trunk, which implies that a single trunk may have different busy fractions as seen from each of the two exchanges connected thereto.

Insofar as each exchange already conventionally stores a map in its central unit representative of the state of each of the time slots in the time multiplex links constituting the trunks connected thereto, and insofar as said map is updated in real time, said central unit need only perform trivial processing in order to determine which of the trunks of a trunk group has fewest busy time slots.

Figure 3:
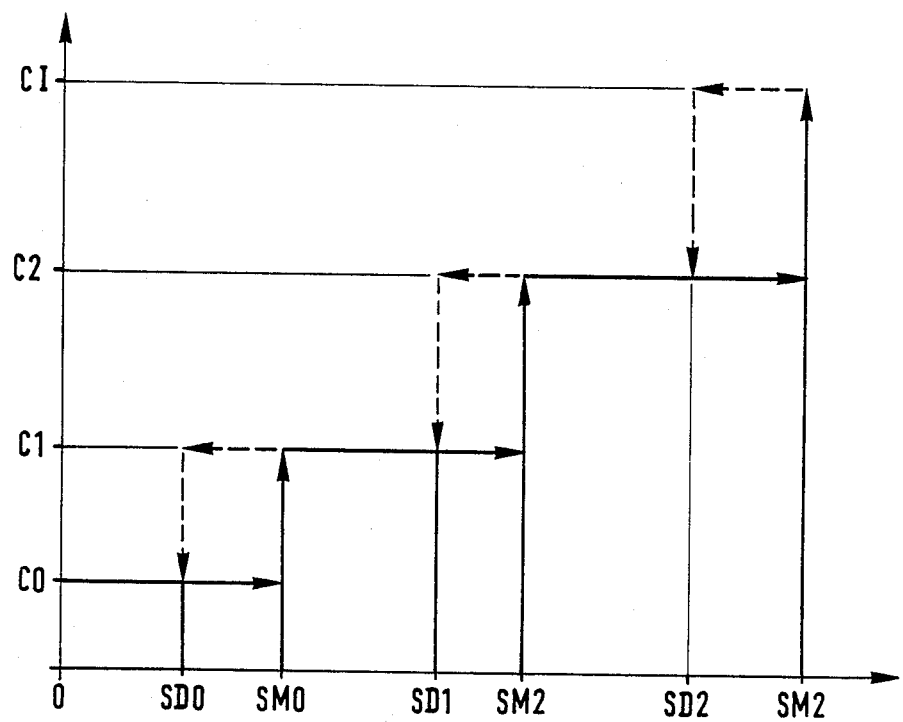
FIG. 3 shows one example of a cost/busy threshold function.

In a preferred implementation, the cost of a trunk is defined by a threshold function of the busy fraction of the least busy time slot, as can be seen in FIG. 3.

The function comprises, for example, three up thresholds SM0, SM1, and SM2 whose values are fixed by the network operator who may modify them by changing the operating program data, if necessary.

Each time a threshold is passed, there is a discrete change in cost value. The first or empty cost value CO is used to cause traffic through the network to transit preferentially via one of the trunk groups from a given exchange compared with the other trunk groups, or to cause traffic to transit preferentially via one ramification of several trunk groups rather than via the others. For example, group 23 may be given a lower cost than group 24 as seen from exchange D so that communications transit preferentially via exchange B rather than via exchange C.

Each time increasing traffic over a given trunk group as seen from one exchange crosses a threshold, the corresponding utilization cost steps from the not-busy value C up to an "infinite" cost value CI which corresponds to the trunk group being unavailable, passing in the increasing traffic direction, for example, via a value C1 which corresponds to passing up threshold SM0 to five busy time clocks in the least busy trunk and via a value C2 corresponding to passing up threshold SM1 of (more) time slots.

Down thresholds SD0, SD1 and SD2 used with decreasing traffic have smaller values than the corresponding up thresholds SM0, SM1, and SM2 used with increasing traffic in order to avoid endless oscillating type changes in cost whenever the traffic on the least busy trunk is in the vicinity of an up threshold.

In a manner known per se, the utilization cost of the trunk groups from an exchange are converted into binary form, and in the simplified example shown here into the form of a 2-bit word corresponding to four cost values CO to CI, and each exchange associates the cost of each trunk group with a data item enabling said group to be identified both for the purpose of storing said information and for broadcasting it to other exchanges in the network.

In a preferred implementation, each exchange produces an "update" message each time there is a significant change in the utilization cost of a trunk group connected thereto, i.e. each time a threshold is crossed.

This message comprises:

an item identifying the exchange concerned and the trunk group concerned, for example by a message element indicating both ends of the trunk group concerned, for example ends 0 and F for trunk group OF, with the first-mentioned end corresponding, for example, to the message originating at exchange O;

an order number identifying the update for the trunk group under consideration, said number being conventionally obtainable by incrementing by unity the order number of the previous update for the same trunk group as seen from the same exchange; and a data item concerning the current utilization cost, i.e. the operating cost of the corresponding trunk group.

Each update message is conventionally converted into binary form and then transmitted from the exchange concerned over the signalling time slot of one of the trunks, e.g. the least busy trunk of the each trunk group connected thereto, in order to cause it to be transmitted to all of the exchanges to which said exchange is connected, for example exchange C may transmit to exchanges E, F, and D over trunk groups 25, 20, and 24.

Each of the exchanges receiving an update message transmits it to all of its neighbors except the neighbor from which it received it, for example exchange D transmits to exchanges B and G, thereby causing each update message to be transmitted by contagion to all of the exchanges in the network, with each exchange using the message order number to check whether or not it has already received said message, to store a newly received message, and to retransmit a newly received message to other exchanges.

In addition, each exchange retransmits the various updates concerning the currently applicable utilization cost established thereby at a rate which can be modified by the network operator. Since the order numbers of these updates remain unaltered, the other exchanges can check whether the information they have is correct, and they can update it, where applicable.

Thus, all of the exchanges in a network are normally fully aware of the cost of all of the various trunk groups in the network, and each of them is therefore in a position to define paths for the calls requested of them.

The search for a routing by a central unit in an exchange is performed using a shortest path search algorithm, of the type known as Dijkstra's algorithm, which is described, in particular, in the article "A Theorem on the Expected Complexity of Dijkstra's Shortest Path Algorithm" published in 1985 volume 6 number 3 of "Journal of Algorithms" by K. Noshita.

This search determines the least cost path taking account of the cost of the various trunk groups used and the number of exchanges passed through in order to set up a call through the network, for example a call between exchanges O and D passes either via exchange G and trunk groups 15 and 27, or else at least two intermediate exchanges are required selected from exchanges E, C, F, and B.

Once the search has been performed at a given originating exchange for setting up a given call to a given destination exchange, the originating exchange generates a message which sets up the path and specifies the various exchanges that it passes through. This message is transmitted from the originating exchange to that one of the exchanges on the selected path to which it itself is directly connected via a trunk group. The signalling time slot of one of the trunks in the trunk group concerned, e.g. one of the trunks in group 26 for originating exchange O, is used during successive number 16 time slots to transmit a sequence of codes E, C, and D identifying the exchanges through which a routing passes until the call under question reaches the last exchange D in the sequence.

Each of the intermediate exchanges concerned, e.g. E, switches the message it receives to the trunk group serving the next designated exchange, in this case C, after it has used its own central unit to analyze the message received and after it has removed from the message that portion thereof which related specifically to itself.

In conventional manner, when the routing cannot be established, for example by virtue of one of the trunk groups becoming unavailable after the routing has been selected and prior to it being established, the call is rejected and must be started over in order to obtain a new routing.

I claim:

1. A method of routing calls for digital time-switched exchanges interconnected by trunk groups each of which interconnects two exchanges over one or more PCM trunks, characterized in that each exchange determines in real time a utilization cost for each of the trunk groups connected thereto on the basis of the busy fraction of the least busy trunk in the trunk group under consideration as seen from the exchange, and broadcasts an operating update by contagion over the trunk groups to the other exchanges in the network whenever there is a significant modification in the utilization cost of a trunk group connected thereto, said update specifying at least the identity of the originating exchange and the identity of the trunk group concerned, together with the order number of said update and the new utilization cost to be taken into account, each exchange storing all of the operating updates produced thereby or received from other exchanges, and in that the routing of a call to be set up through the network is selected by the network exchange from which said call is initially requested, which exchange itself determining the minimum utilization cost routing by means of a shortest path search algorithm known per se, and on the basis of the stored updates, and producing a routing set-up message specifying the network exchange(s) through which the call is to pass, said set-up message being transmitted over the trunk groups concerned as the chosen routing is set up and being reduced at each exchange by the portion concerning said exchange itself.

2. A routing method according to claim 1, characterized in that each of the two exchanges served by the same trunk group in a network individually determines the "directional" utilization cost of that trunk group.

3. A routing method according to claim 2, characterized in that the utilization cost of a trunk group in one direction is a function of the busy fraction thresholds of the circuit is in the least busy PCM trunk in the group.

4. A routing method according to claim 3, characterized in that the busy fraction thresholds for the trunk which is temporarily the least busy trunk in a group, which thresholds are determined or selected by the network operator, are smaller for decreasing traffic than for increasing traffic so as to avoid oscillations about equilibrium values.

5. A routing method according to claim 1, characterized in that the minimum utilization cost calculation for a routing includes a transit cost factor taking account of the number of exchanges through which it passes.

6. A routing method according to claim 1, characterized in that the updates specifying the utilization cost of a trunk group from an exchange as transmitted on each significant change, and in particular each time a threshold is crossed, are also periodically retransmitted at a frequency determined by the network operator.

* * * * *